(12) United States Patent
Froggatt et al.

(10) Patent No.: US 10,416,391 B2
(45) Date of Patent: Sep. 17, 2019

(54) INTERFEROMETRIC ALIGNMENT OF OPTICAL MULTICORE FIBERS TO BE CONNECTED

(71) Applicant: INTUITIVE SURGICAL OPERATIONS, INC., Sunnyvale, CA (US)

(72) Inventors: Mark Froggatt, Blacksburg, VA (US); Eric Sanborn, Blacksburg, VA (US); Jeffrey Lacroix, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 15/524,388

(22) PCT Filed: Mar. 24, 2016

(86) PCT No.: PCT/US2016/024021
§ 371 (c)(1),
(2) Date: May 4, 2017

(87) PCT Pub. No.: WO2016/160513
PCT Pub. Date: Oct. 6, 2016

(65) Prior Publication Data
US 2018/0172920 A1 Jun. 21, 2018

Related U.S. Application Data

(60) Provisional application No. 62/139,096, filed on Mar. 27, 2015.

(51) Int. Cl.
*G02B 6/02* (2006.01)
*G02B 6/38* (2006.01)
(Continued)

(52) U.S. Cl.
CPC .......... *G02B 6/3843* (2013.01); *G01B 11/272* (2013.01); *G01M 11/3172* (2013.01);
(Continued)

(58) Field of Classification Search
CPC ............ G02B 6/02042; G02B 6/02076; G02B 6/3843; G02B 6/3834–43; G02B 6/3877
See application file for complete search history.

(56) References Cited

U.S. PATENT DOCUMENTS 4,109,994 A    8/1978   Chown
4,306,766 A   12/1981   Karol
(Continued)

FOREIGN PATENT DOCUMENTS

CN    1383005 A    12/2002
CN    1793843 A     6/2006
(Continued)

OTHER PUBLICATIONS

Sergey V. Shatalin, Vladimir N. Treschikov, and Alan J. Rogers, "Interferometric optical time-domain reflectometry for distributed optical-fiber sensing," Applied Optics y vol. 37, No. 24 y Aug. 20, 1998.*
(Continued)

*Primary Examiner* — Shawn Decenzo
(74) *Attorney, Agent, or Firm* — Schwegman Lundberg & Woessner, P.A.

(57) ABSTRACT

The ends of sensing and interrogating multicore fibers are brought into proximity for connection in a first orientation with one or more cores in the sensing fiber being paired up with corresponding one or more cores in the interrogating fiber. Optical interferometry is used to interrogate at least one core pair and to determine a first reflection value that represents a degree of alignment for the core pair in the first orientation. The relative position is adjusted between the
(Continued)

ends of the fibers to a second orientation. Interferometry is used to interrogate the core pair and determine a second reflection value that represents a degree of alignment for the core pair in the second orientation. The first reflection value is compared with the second reflection value, and an aligned orientation is identified for connecting the sensing and interrogating fibers based on the comparison.

23 Claims, 9 Drawing Sheets

(51) Int. Cl.
  *G01B 11/27*    (2006.01)
  *G01M 11/00*   (2006.01)
(52) U.S. Cl.
  CPC ..... *G02B 6/02042* (2013.01); *G02B 6/02076* (2013.01); *G02B 6/3877* (2013.01); *G02B 6/3881* (2013.01)

(56) References Cited

U.S. PATENT DOCUMENTS

| | | | | |
|---|---|---|---|---|
| 5,559,909 | A * | 9/1996 | Anderson | G02B 6/3504 385/16 |
| 8,773,650 | B2 | 7/2014 | Froggatt et al. | |
| 8,801,301 | B2 * | 8/2014 | Bradley | G02B 6/3885 385/78 |
| 10,203,265 | B2 * | 2/2019 | Hayashi | G01M 11/31 |
| 2005/0004453 | A1 * | 1/2005 | Tearney | A61B 5/0066 600/427 |
| 2011/0202069 | A1 * | 8/2011 | Prisco | G01D 5/35316 606/130 |
| 2011/0229085 | A1 * | 9/2011 | Bradley | G02B 6/3885 385/78 |
| 2012/0069347 | A1 | 3/2012 | Klein et al. | |
| 2012/0176607 | A1 | 7/2012 | Ott | |
| 2012/0328238 | A1 * | 12/2012 | Inoue | G02B 6/32 385/16 |
| 2013/0331689 | A1 | 12/2013 | Le et al. | |
| 2014/0112615 | A1 | 4/2014 | Kreger et al. | |
| 2017/0082806 | A1 * | 3/2017 | Van Der Mark | G02B 6/3825 |
| 2017/0322113 | A1 * | 11/2017 | Gifford | G01M 11/3172 |
| 2018/0172920 | A1 * | 6/2018 | Froggatt | G02B 6/3843 |

FOREIGN PATENT DOCUMENTS

| | | |
|---|---|---|
| CN | 103052368 A | 4/2013 |
| CN | 104169678 A | 11/2014 |
| EP | 0943110 B1 | 3/2005 |
| JP | S5683712 A | 7/1981 |
| JP | S6022107 A | 2/1985 |
| JP | 2012032524 A | 2/2012 |
| JP | 2013054116 A | 3/2013 |
| WO | WO 98/23984 | 6/1998 |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

International Search Report and Written Opinion of the ISA dated Jul. 20, 2016, 14 pages.

Askins, Charles G. et al., "Bend and Twist Sensing in a Multi-Core Optical Fiber," Optical Fiber Communications/National Fiber Optic Engineers conference, 2008 (OFC/NFOEC 2008), Feb. 24-28, 2008, San Diego, CA, pp. 1-3, IEEE.

Duncan R.G., et al., "High-Accuracy Fiber-Optic Shape Sensing," Proceedings of SPIE—International Symposium on Smart Structures and Materials, Mar. 29, 2007, vol. 6530, pp. 65301S-1-65301S-11, XP055372588.

Extended European Search Report for Application No. EP16773799.8 dated Nov. 7, 2018, 8 pages.

* cited by examiner

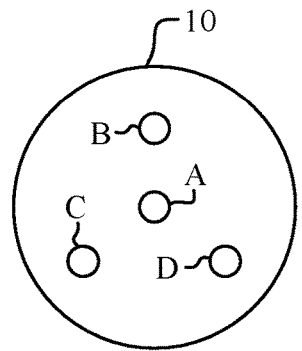
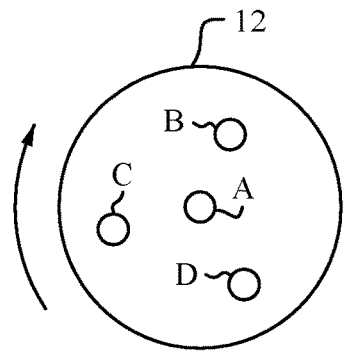
Figure 1A         Figure 1B
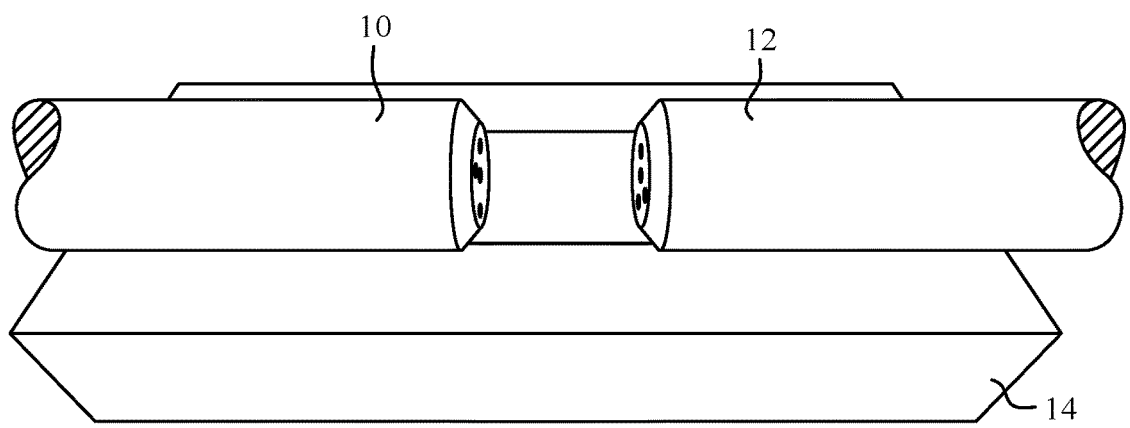
Figure 2

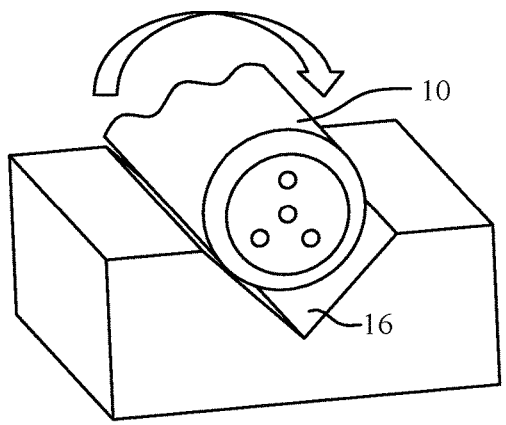
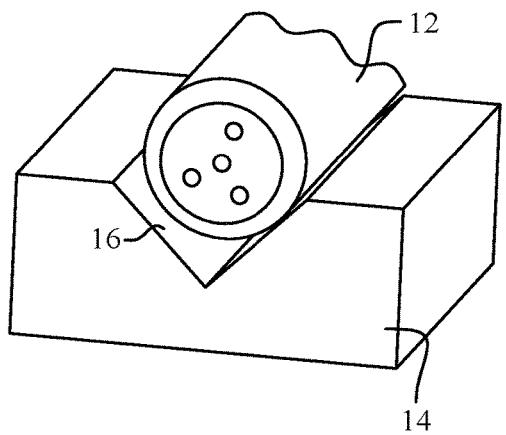
Figure 3A    Figure 3B
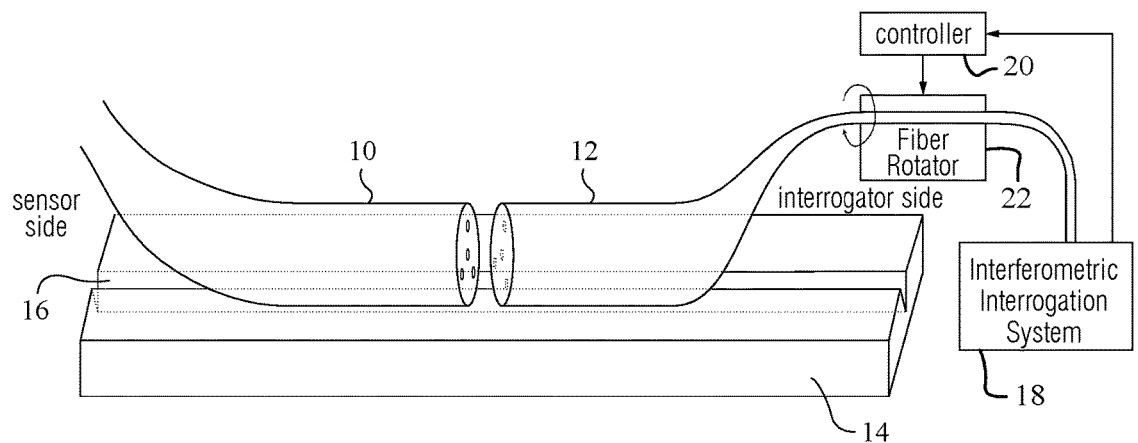
Figure 4

Figure 9B  Abutting cleaved ferrule and fibers

INTERFEROMETRIC ALIGNMENT OF OPTICAL MULTICORE FIBERS TO BE CONNECTED

RELATED APPLICATIONS

This application is the U.S. national phase of International Application No. PCT/US2016/024021 filed Mar. 24, 2016 which designated the U.S. and claims priority to and the benefit of the filing date of U.S. Provisional Patent Application 62/139,096, entitled "INTERFEROMETRIC ALIGNMENT OF OPTICAL MUTICORE FIBERS TO BE CONNECTED," filed Mar. 27, 2015, the entire contents of each of which is are incorporated by reference.

TECHNICAL FIELD

The technology relates to optical fiber connections.

INTRODUCTION

Optical fibers contain one or more optical cores surrounded typically by cladding, a buffer material, and a jacket. Optical fibers need to be connected accurately, reliably, and inexpensively. This is challenging for optical fibers that contain multiple optical cores, referred to as a "multicore fiber," because each of the corresponding cores should be aligned when two multicore fibers are connected. Even when the outer surfaces of the two multicore fibers, e.g., the ferrules covering the fibers, are aligned in a connector, the corresponding cores within the connector for the two fibers may not be aligned or could be aligned more accurately. Small misalignments can adversely impact the amount of light transferred between the connected multicore fibers.

SUMMARY

Example embodiments of the technology described in this application relate to a method for aligning one or more cores in a sensing multicore optical fiber with one or more cores in an interrogating multicore optical fiber. Each core in the sensing multicore optical fiber is paired with a respective core in the interrogating multicore optical fiber to form a core pair. Optical interferometry is used to interrogate at least one core pair through the interrogating core and to determine a first reflection value from the sensing core in the core pair that represents a degree of alignment for the core pair in a first orientation. Optical interferometry is also used to interrogate the core pair through the interrogating core and to determine a second reflection value from the sensing core in the core pair that represents a degree of alignment for the core pair in a second orientation. An alignment orientation for the core pair is identified based on the first reflection value and the second reflection value.

The method may be performed for multiple core pairs.

The relative position between the ends of the sensing and interrogating cores may be adjusted to the aligned orientation, and the sensing multicore optical fiber connected to the interrogating multicore optical fiber with the core pair in the alignment orientation. In one example implementation, the first reflection value that represents a degree of alignment for the core pair in the first orientation is compared with the corresponding second reflection value that represents a degree of alignment for the core pair in the second orientation, and the alignment orientation for connecting the core pair is identified based on the comparing. The adjusting may include rotation of one or both of the sensing core followed by interrogating core in the core pair.

In another example implementation, at least the ends of the sensing and interrogating multicore fibers are placed in a groove of a structure with the ends of the sensing and interrogating multicore fibers being brought into proximity for connection. One or both of the sensing and interrogating multicore fibers is then rotated in the groove.

In another example implementation, the sensing multicore fiber is included in a first ferrule and the interrogating multicore fiber is included in a second ferrule. The adjusting includes rotation of one or both of the first and second ferrules. At least the ends of the first and second ferrules may be placed in a split sleeve connector, and one or both of the first and second ferrules is/are rotated while the first and second ferrules are in the split sleeve.

The optical interferometry may for example be optical frequency domain reflectometry (OFDR).

As described in more detail below, the sensing multicore optical fiber is associated with a surgical instrument an example application. OFDR sensing and processing of reflected light from the sensing multicore optical fiber is used to determine the position and/or shape of at least some portion of the surgical instrument.

In example implementations, the aligned orientation for connecting the core pair is identified based on a largest minimum measured reflection amplitude for the core pair and/or based on one or more of insertion loss and return loss for the core pair. The first and second reflection values may be from Bragg gratings in the sensing core of the core pair and/or from Rayleigh scatter in the sensing core of the core pair.

Example embodiments of the technology described in this application also relate to an apparatus for aligning one or more cores in a sensing multicore optical fiber and one or more cores in an interrogating multicore optical fiber, where each core in the sensing multicore optical fiber is paired with a respective core in the interrogating multicore optical fiber to form a core pair. An optical interferometer is configured to interrogate at least one core pair and to determine a first reflection value from the sensing multicore optical fiber in the core pair that represents a degree of alignment for the core pair in the first orientation. The optical interferometer is further configured to interrogate the core pair through the interrogating core and to determine a second reflection value from the sensing core in the core pair that represents a degree of alignment for the core pair in a second orientation. Circuitry is configured to identify an alignment orientation for the core pair based on the first reflection value and the second reflection value.

An actuator is configured to adjust the relative position between the ends of the sensing and interrogating multicore optical fibers to a second orientation. A connector is configured to connect the sensing multicore optical fiber to the interrogating multicore optical fiber with the core pair in the alignment orientation. For example, the actuator may be configured to rotate one or both of the sensing and interrogating multicore fibers.

In an example implementation, the apparatus includes a structure having a groove, and wherein the actuator is configured to rotate one or both of the sensing and interrogating multicore fibers while the sensing and interrogating multicore fibers are in the groove.

In an example implementation, the apparatus includes a first ferrule including the sensing multicore fiber and a second ferrule including the interrogating multicore fiber. The actuator is configured to rotate one or both of the first and second ferrules. A split sleeve structure may be used to encompass at least the ends of the first and second ferrules configured to bring the ends of the sensing and interrogating multicore fibers into proximity for connection. In this example, the actuator is configured to rotate one or both of the first and second ferrules while the first and second ferrules are in the split sleeve.

Example embodiments of the technology described in this application also relate to a surgical system that includes a first multicore optical fiber having one or more cores and a mounting interface for a surgical instrument. The surgical instrument includes a second multicore optical fiber. Each core in the first multicore optical fiber is paired with a respective core in the second multicore fiber to form a core pair. An optical interferometer coupled to the first multicore fiber is configured to interrogate at least one core pair in a first orientation to determine a first reflection value from the second multicore optical fiber in the core pair, and interrogate the core pair in a second orientation to determine a second reflection value from the second multicore optical fiber in the core pair. The first and second reflection values represent first and second degrees of alignment, respectively, for the core pair. A processor is configured to identify an alignment orientation for the core pair based on the first reflection value and the second reflection value.

In an example implementation, an actuator is configured to adjust the relative position between the ends of the first and second multicore optical fibers to a second orientation. A connector is configured to connect the second multicore optical fiber to the first multicore optical fiber with the core pair in the alignment orientation. The actuator may be configured to rotate one or both of the first multicore optical fiber and the second multicore optical fiber while the first multicore optical fiber and to the second multicore optical fiber are in a groove. Another alternative is to use a first ferrule including the first multicore optical fiber and a second ferrule including the second multicore optical fiber. The actuator is configured to rotate one or both of the first and second ferrules. At least the ends of the first and second ferrules may be placed in a split sleeve structure to bring the ends of the first and second multicore optical fibers into proximity for connection. In this case, the actuator is configured to rotate one or both of the first and second ferrules while the first and second ferrules are in the split sleeve.

In an example implementation, the optical interferometer includes an optical frequency domain reflectometer which is configured to sense and process reflected light from the second multicore optical fiber to determine the position and/or shape of at least some portion of the surgical instrument.

A method, apparatus, and surgical system as described herein.

BRIEF DESCRIPTION OF THE DRAWINGS

FIGS. 1A and 1B show cross-sections of misaligned multicore fibers to be connected;

FIG. 2 shows an example v-shaped groove support for bringing two multicore fibers into abutment for connection;

FIGS. 3A and 3B show a breakaway of both sides of the supported fibers from FIG. 2 indicating that rotation of at least one of the fibers is needed for better core alignment;

FIG. 4 illustrates a non-limiting example embodiment for an interferometrically-based multicore fiber alignment system;

DETAILED DESCRIPTION

Figure 5:
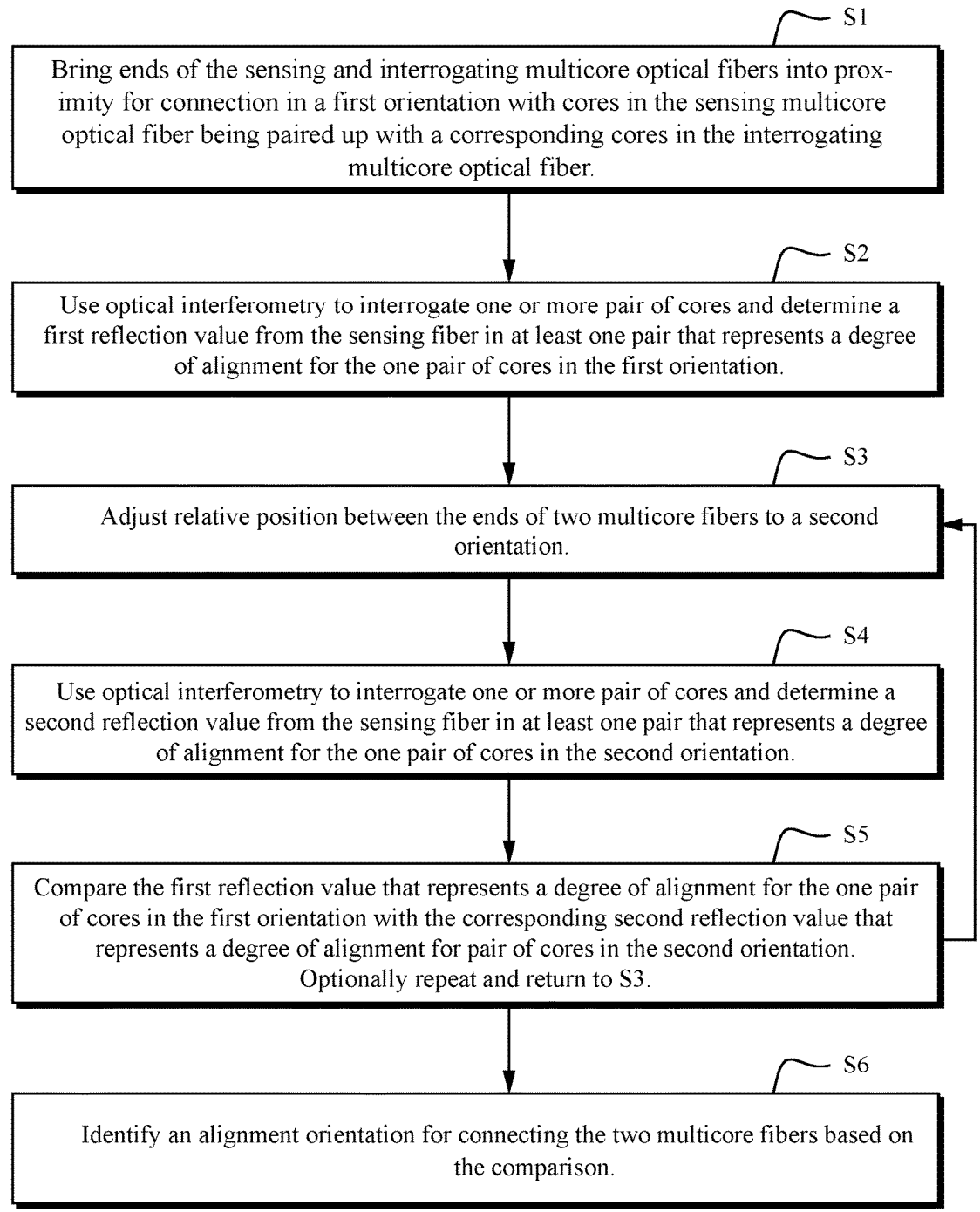
FIG. 5 is a flowchart illustrating example procedures for interferometrically-based multicore fiber alignment for connection.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

There are a variety of ways that two optical fibers may be connected such as but not limited to mechanical splicing that holds the ends of the fibers together mechanically and fusion splicing that uses heat to fuse the ends of the fibers together. For purposes of the description below, the term connector encompasses the variety of ways for to connecting optical fibers.

FIGS. 1A and 1B show cross-sections of multicore optical fibers 10 and 12 to be connected, each fiber having four optical cores A, B, C, and D. Although the non-limiting example in the description uses four cores for illustration, the technology set forth in the application applies to two cores, three cores, and greater than four cores. Even when the outer surfaces of the two multicore fibers 10 and 12, e.g., the ferrules covering the fibers, are aligned for connection, the corresponding cores A-A, B-B, C-C, and D-D within or at the connection for the two fibers may not be aligned or could be aligned more accurately. Small misalignments can adversely impact the amount of light transferred between the connected multicore fibers A-A, B-B, C-C, and D-D. FIG. 1B shows a clockwise rotational misalignment around the center core A such that cores B-B, C-C, and D-D for multicore fibers 10 and 12 are not aligned.

FIG. 2 shows an example structure 14 with a V-shaped groove in which the two fibers may be placed for abutment of the connecting ends of the fibers 10 and 12. More particularly, the V-groove provides a fast, simple, and inexpensive structure for bringing two multicore fibers into abutment for connection and typically with the center cores A-A reasonably accurately aligned. But one or more off-center core pairs, B-B, C-C, and D-D in the examples in FIGS. 1A, 1B and 2A and 2B, are misaligned. The V-groove is an example of a groove. More generally, a groove encompasses a channel, a slot, a cut, a depression, and the like.

FIGS. 3A and 3B show a breakaway of both sides of the V-groove supported fibers from FIG. 2 indicating that rotation of at least one of the fibers is needed for better core alignment for the off-center core pairs. When two multicore fibers are connected with misaligned core pairs, optical performance of the connected fiber decreases significantly, e.g., in term of insertion loss, return loss, etc. The groove alignment support is very low cost and advantageously provides a way to align and connect the cores in optical fibers placed into the groove without requiring the fibers to be encased in prealigned ferrules. A non-limiting ferrule and fiber alignment and connection example embodiment is described below in conjunction with FIG. 10.

FIG. 4 illustrates a non-limiting example embodiment for an interferometrically-based multicore fiber alignment system that overcomes these alignment problems and improves the optical performance of the connected fiber dramatically. This alignment system is particularly advantageous when an optical interrogator is connected to the optical fiber in normal use. In other words, since the optical interrogator is already present, using it to provide information about the quality of the core alignment and/or connection does not add expense or significant complexity to the system.

FIG. 4 is described in conjunction with the flowchart in FIG. 5 illustrating example procedures for interferometrically-based multicore fiber alignment. First, the ends of the sensing and interrogating optical multicore fibers 10 and 12 are placed in a groove of structure 14 into proximity for connection in a first orientation with cores in the sensing multicore fiber being paired up with corresponding cores in a second multicore fiber, e.g., cores A-A are a core pair and cores B-B are a core pair (step S1). The sensing fiber 10 in this example is on a sensor or application side of the connection, and the interrogating fiber 12 in this example is on an optical interrogator side of the connection. An optical interferometer (an interferometric interrogation system 18 in the example embodiment of FIG. 4) interrogates one or more pairs of cores and determines a first value that represents a first degree of alignment for one of the one or more pairs of cores in the first orientation (step S2). Although multiple or even all of the pairs of cores may be interrogated and processed, satisfactory results may be obtained by interrogating just one radial core pair (other than the center core pair).

The relative position between the ends of two multicore fibers is adjusted to a second orientation via an actuator (step S3). In the example embodiment of FIG. 5, the actuator is a fiber rotator 22 controlled by a controller 20, which receives an output signal from the interferometric interrogation system 18. Alternatively, a fiber rotator be used on the sensor side, or two fiber rotators could be used. In addition, the fiber rotator may be controlled by a signal directly from the interferometric interrogation system 18.

The optical interferometer subsequently interrogates the one or more pairs of cores and determines a second reflection value from the sensing multicore optical fiber in the one pair of cores that represents a degree of alignment for the one pair of cores in the second orientation (step S4). The first reflection value that represents a degree of alignment for the one pair of cores in the first orientation are compared by a comparator with the corresponding second reflection value that represents a degree of alignment for the one pair of cores in the second orientation (step S5). The comparator could be a part of other circuitry, part of the interferometric interrogation system 18, part of the controller 20, or even a standalone circuit. An alignment orientation for connecting the two multicore fibers may then be determined based on the comparison (step S6). For example, the orientation with the greatest reflection value may be used. Alternatively, the process may repeat one or more times starting from step S3 until an orientation with a greatest reflection value is determined. Still further, the process may repeat one or more times starting from step S3 until a predetermined level of alignment accuracy is achieved. Ultimately, the fibers are connected at the orientation with the desired alignment.

Typically, for fibers with a center core and one or more outer cores, the optical interrogator assesses the quality of the orientation and/or connection between the outer cores of the connected multicore fiber. The interrogator may sense Bragg grating signal amplitude or Rayleigh scatter amplitude from interrogated core pairs depending on the type of sensor. In one example embodiment, the interrogator continuously measures the amplitude of the measured light signal as the connection for one or more core pairs is adjusted. The connection adjustment that produces a largest minimum amplitude across all of the cores may be used for example because tests have shown that performance is often controlled by the lowest performing core pair in a multicore fiber.

Increased optical fiber performance and/or robustness are benefits. Another benefit is that lower tolerance fiber connector can be used, (thereby reducing the cost and/or complexity of the connector), and that lower tolerance compensated for using the adjustment capability described above.

Figure 6:
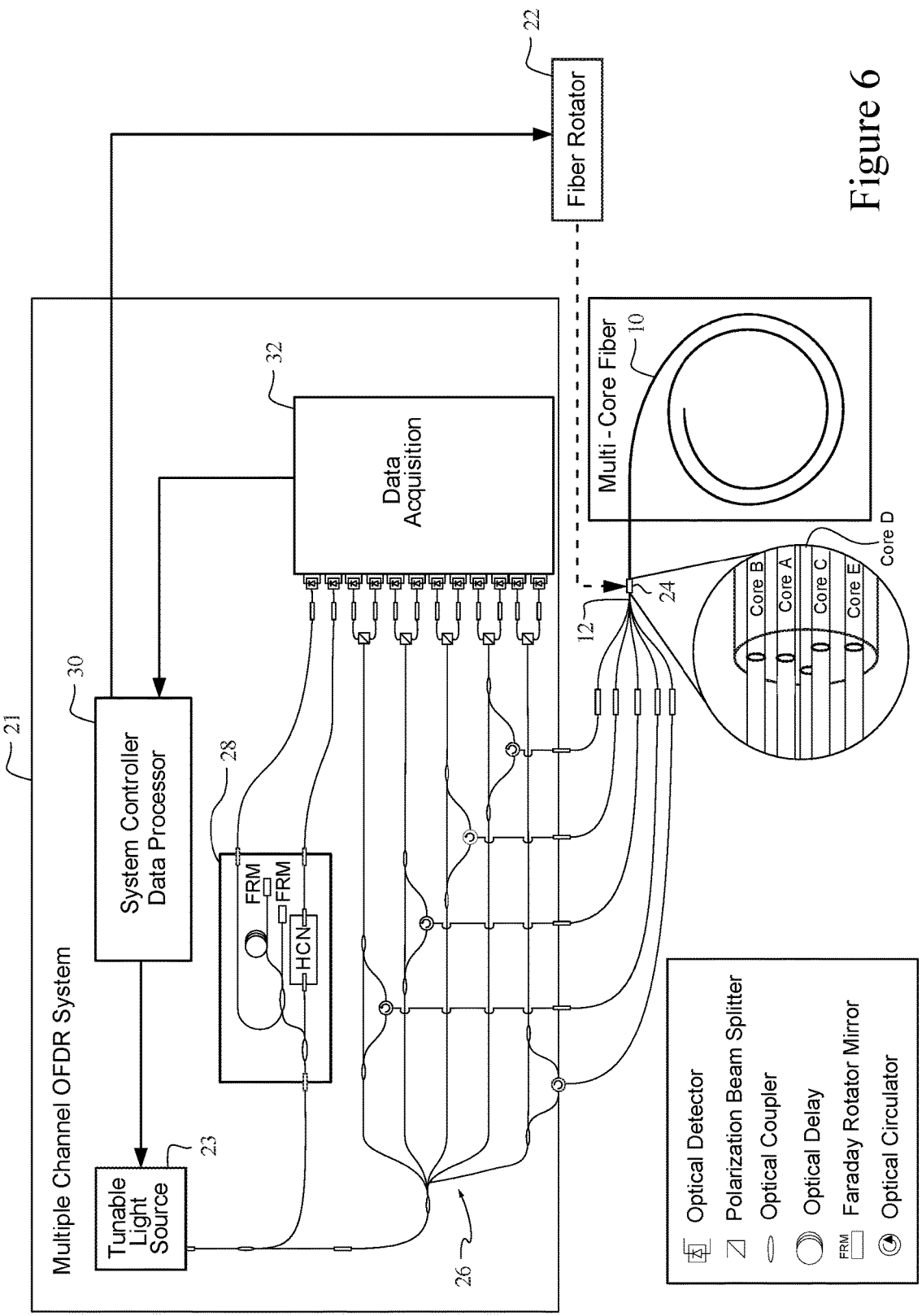
FIG. 6 shows a non-limiting example embodiment using an OFDR-based multicore fiber alignment system.

FIG. 6 shows a non-limiting example embodiment using an Optical Frequency Domain Reflectometry (OFDR)-based multicore fiber alignment system that finds advantageous example application to optical strain sensing. Optical strain sensing is useful for measuring physical deformation of a core caused by, for example, the change in tension, compression, or temperature of an optical fiber. A continuous measure of strain along the length of a core can be derived by interpreting the optical response of the core using swept wavelength inteferometery. Optical time domain measurements with high resolution and high sensitivity may be achieved using Optical Frequency Domain Reflectometry (OFDR). These measurements enable several important fiber-optic sensing technologies, such as distributed strain sensing. Distributed strain measurements performed upon a multi-core optical fiber permit determination of a three dimensional position of the fiber as detailed in U.S. Pat. No. 8,773,650, the contents of which are incorporated herein by reference. A multiple channel OFDR is connected to several independent optical or cores within the multi-core optical fiber. The strain responses of these cores (reflections from Bragg gratings in the core and/or reflections Rayleigh scatter in the core) are simultaneously measured as the fiber is placed in a given configuration. The relative positions of the cores along the length of the multi-core optical fiber allow determination of a strain profile of the multi-core optical fiber. The strain profile may be used to determine the three dimensional position of the fiber, or one or more of the components (1)-(3) of this profile may be used independently.

An OFDR-based distributed strain sensing system includes a tunable light source 23, an interferometric interrogator 26, a laser monitor network 28, an optical fiber sensor including an interrogator side fiber 12, a connector 24, and a sensor side fiber 10, data acquisition electronic circuitry 32, and a system controller data processor 30 as depicted in an example multi-channel OFDR system 21 in FIG. 6. Each channel corresponds to a fiber core.

Figure 7:
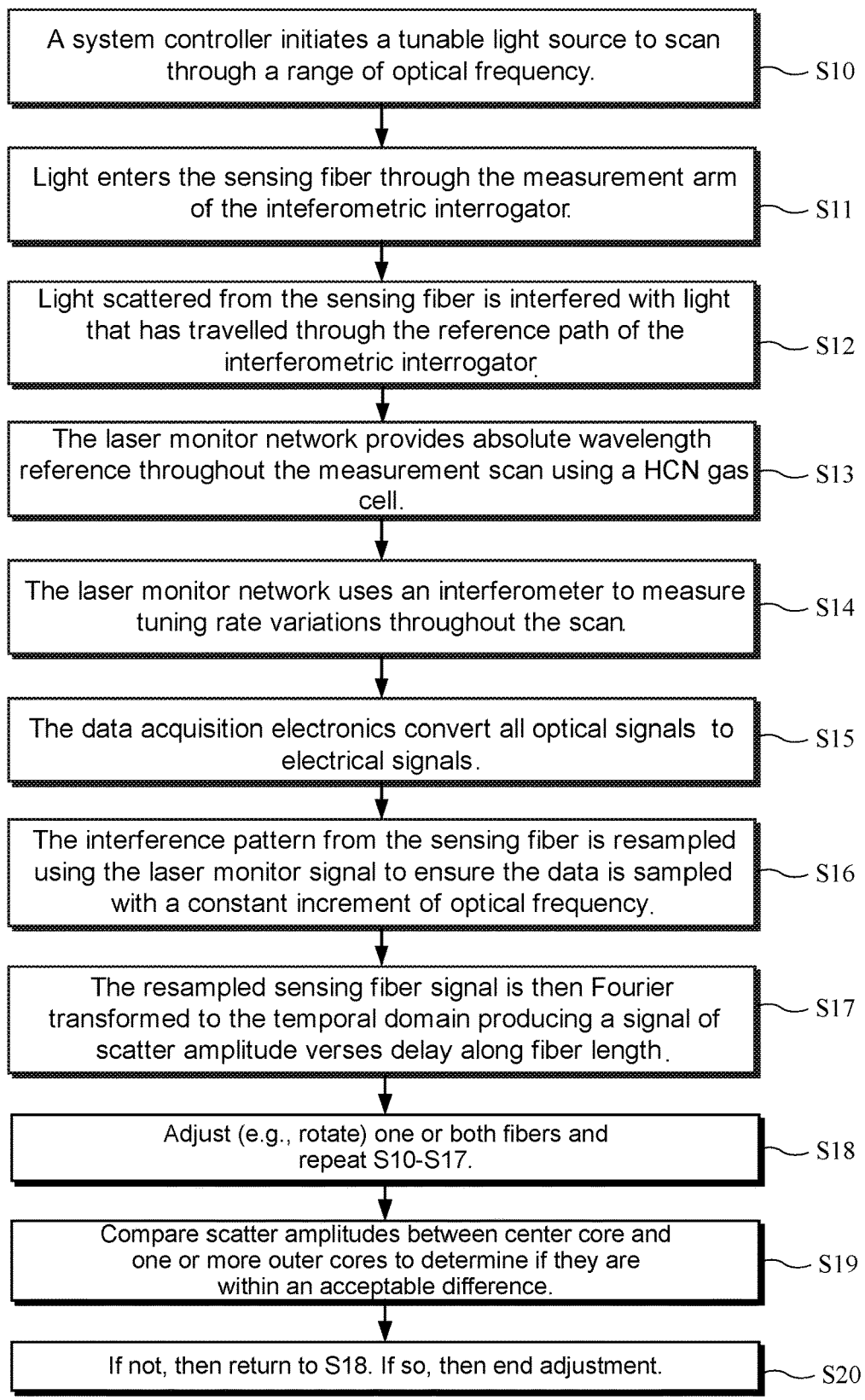
FIG. 7 is a flowchart illustrating example procedures for interferometrically-based multicore fiber alignment for connection for interferometrically-based multicore fiber alignment system in FIG. 7.

FIG. 7 is a flowchart illustrating example procedures for interferometrically-based multicore fiber alignment and connection for interferometrically-based multicore fiber alignment and connection system in FIG. 6. The steps describe the operation for one core that is applied to each of the cores in the multicore fiber.

During an OFDR measurement, a tunable light source 23 is swept through a range of optical frequencies (step S10). This light is split with the use of optical couplers and routed to two separate interferometers 26 and 28. The first interferometer 26 serves as an interferometric interrogator and is connected via a connector 24 to a length of multicore sensing fiber. Light enters the multicore sensing fiber 10 through the measurement arm of the interferometric interrogator 26 (step S11). Scattered light from the sensing fiber 10 is then interfered with light that has traveled along the reference arm of the interferometric interrogator 26 (step S12). The laser monitor network 28 contains a Hydrogen Cyanide (HCN) gas cell that provides an absolute wavelength reference throughout the measurement scan (step S13). The second interferometer, within the laser monitor network 28, is used to measure fluctuations in tuning rate as the light source is scanned through a frequency range (step S14). A series of optical detectors (e.g., photodiodes) convert the light signals from the laser monitor network, gas cell, and the interference pattern from the sensing fiber to electrical signals (step S15). A data processor in a data acquisition unit 32 uses the information from the laser monitor 28 interferometer to resample the detected interference pattern of the sensing fiber 10 so that the pattern possesses increments constant in optical frequency (step S16). This step is a mathematical requisite of the Fourier transform operation. Once resampled, a Fourier transform is performed by the system controller 30 to produce a light scatter signal in the temporal domain for an initial orientation of the multicore fibers 12 or 10 (step S17). In the temporal domain, the amplitudes of the light scattering events are depicted verses delay along the length of the fiber. Using the distance that light travels in a given increment of time, this delay can be converted to a measure of length along the sensing fiber. In other words, the light scatter signal indicates each scattering event as a function of distance along the fiber. The sampling period is referred to as the spatial resolution and is inversely proportional to the frequency range that the tunable light source 23 was swept through during the measurement.

One or both of the multicore fibers 12 or 10 is adjusted to a new orientation, e.g., rotated by fiber rotator 22 or by a ferrule rotator such as that shown below in FIG. 10, and then the steps S10-S17 are repeated (step S18). The scatter amplitudes for the initial orientation are compared to those for the new orientation (or the amplitudes for the two most recent orientations are compared) to determine if they are within an acceptable difference (step S19). If not, then the process returns to step S18; if so, then the adjustment is complete (step S20), and the fibers are connected.

Figure 8:
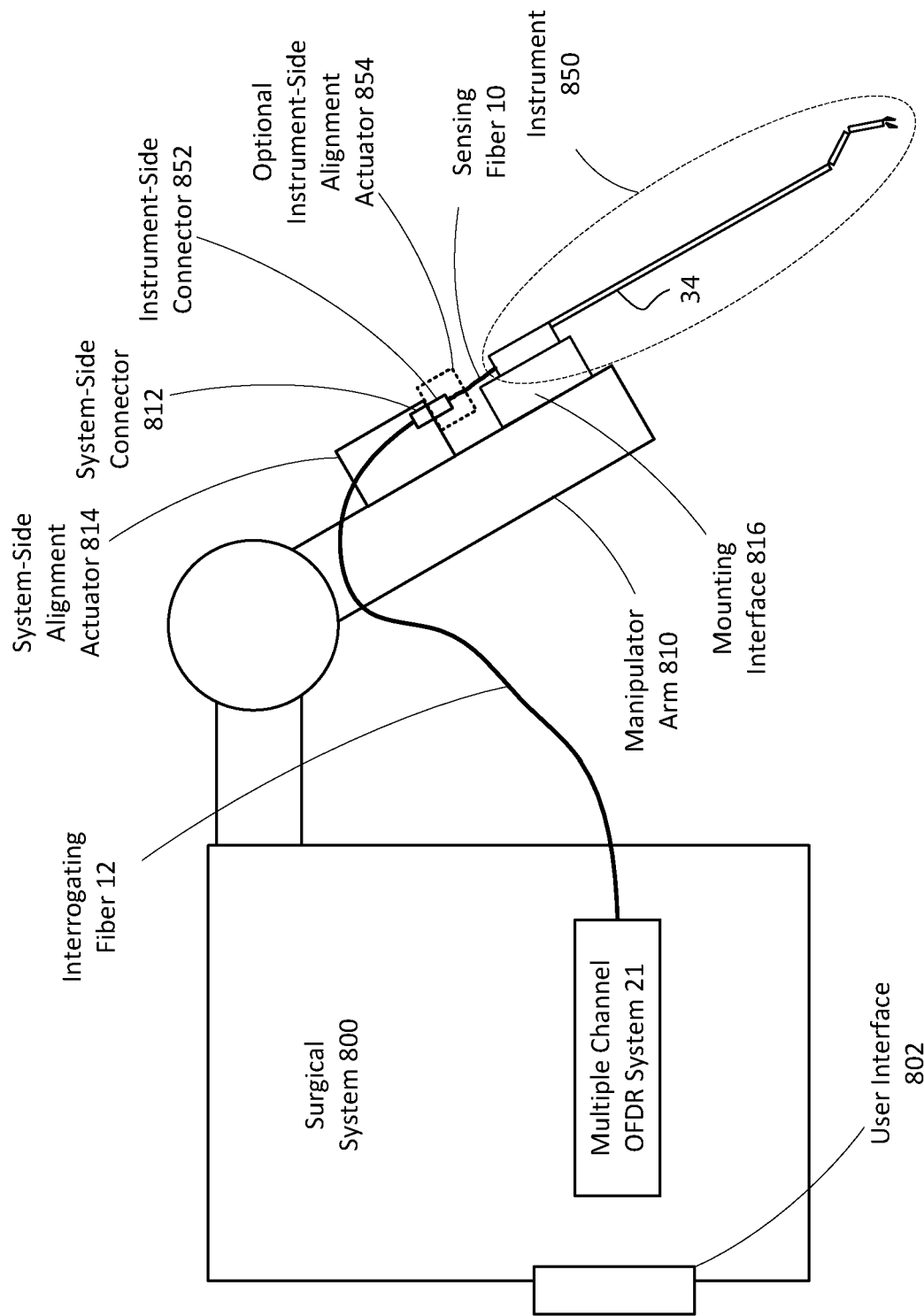
FIG. 8 shows a non-limiting example embodiment in a surgical system.

FIG. 8 shows a non-limiting example embodiment for a surgical system 800 that includes a manipulator arm 810 on which a surgical instrument 850 is removably mounted via a mounting interface 816. Mounting interface 816 allows communication between surgical system 800 and instrument 850 of power, data, control signals, and any other operative modalities. A local or remote user interface 802 allows a user to interact with surgical system 800 and instrument 850.

Surgical system 850 further includes a multiple channel OFDR system 21 coupled to an interrogating fiber 12 that terminates in a connector 812. Instrument 850 includes a sensing fiber 10 that terminates in a connector 852 that mates with connector 812. Surgical system 850 also includes an alignment actuator 814 that allows rotation of fiber 12 in response to measurements by multiple channel OFDR system 21 to align the interrogator side and sensor side fibers for connection 24, as explained in example embodiments above (in various embodiments, multiple channel OFDR system 21 can also be used to measure the shape of and/or strain associated with surgical instrument 850 during clinical use).

In some embodiments, alignment actuator 814 can be an active adjustment mechanism (e.g., a motorized system that adjusts the rotation of interrogating fiber 12 with respect to sensing fiber 10 in response to the output of multiple channel OFDR system 21), and in other embodiments, alignment actuator 814 can be a passive adjustment mechanism (e.g., a manually adjustable structure that a user manipulates in response to the output of multiple channel OFDR system 21). In various other embodiments, alignment actuator 814 can include both automated and manual adjustment capabilities.

While alignment actuator 814 is depicted on manipulator arm 810 for exemplary purposes, in various other embodiments, alignment actuator 814 can be positioned anywhere on surgical system 800. In various other embodiments, instrument 850 can additionally or alternatively include its own alignment actuator 854 (active and/or passive) for adjusting the rotation of sensing fiber 10 with respect to interrogating fiber 12. Note further that the particular routing and placement of sensing fiber 10 and interrogating fiber 12 depicted in FIG. 8 is intended to be exemplary and not limiting. For example, in various embodiments, fiber 12 can be routed on or within manipulator arm 810 or along any other path.

Figure 9A:
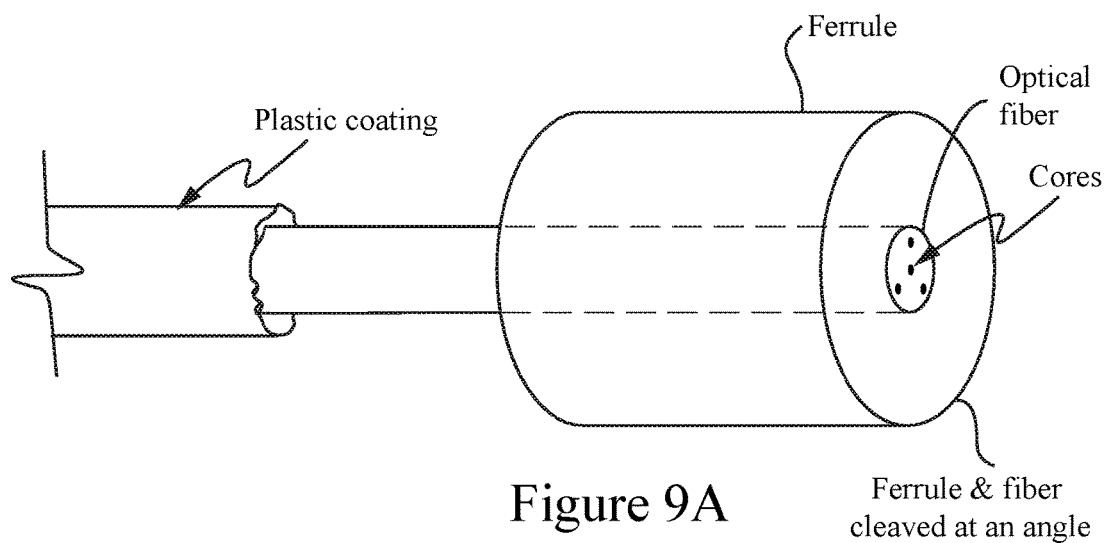
FIG. 9A shows a multicore fiber in a ferrule with FIGS. 9B and 9C showing a side view of an exaggerated example of cleaved ends of abutting misaligned multicore fibers to be connected in their respective ferrules.
Figure 9C:
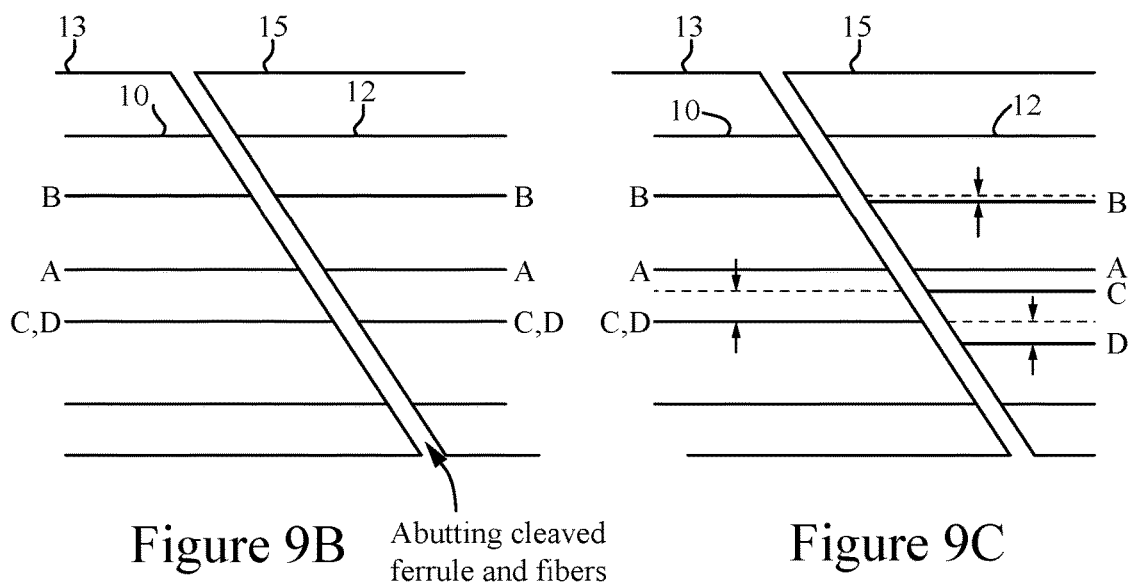

FIG. 9A shows a non-limiting example embodiment involving a multicore fiber in a ferrule. FIGS. 9B and 9C showing a side view of an exaggerated example of cleaved ends of abutting misaligned multicore fibers 10 and 12 to be connected in their respective ferrules 13 an 15. Ferrule mounted fibers are often angle polished to reduce reflection with ferrule and fiber end angles other than 90 degrees, e.g., 8 or 9 degrees from vertical. Alignment of ferrule mounted fibers is also a problem, even in the presence of the angle polish. Even when the outer surfaces of the angularly cleaved ferrules 13 and 15 are aligned for connection and the center core pair A-A is aligned, the corresponding core pairs B-B, C-C, and D-D for the multicore fibers 10 and 12 are not aligned, as indicated by the dashed lines. The amount of height displacement is indicated with double-headed arrows. Accordingly, some rotation of the ferrule can improve the fiber connection.

Figure 10:
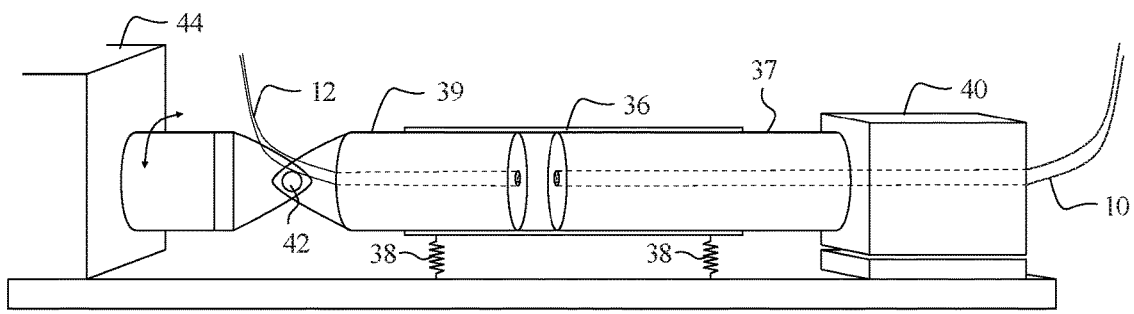
FIG. 10 shows non-limiting example details for mounting two multicore fibers for alignment in accordance with another example embodiment.

FIG. 10 shows non-limiting details for an example connector for connecting two multicore fibers embedded in their respective ferrules for alignment in accordance with another example embodiment. FIGS. 3A and 3B above show a groove to initially align the center cores of two optical fibers for connection without ferrules. FIG. 10 uses a split sleeve connector because commercially available and inexpensive sapphire ferrules and split sleeve connectors do a good job of aligning the center cores of multicore fibers that have center cores when the two ferrules are abutted together. This relatively cheap and easy split sleeve connector restricts the active alignment to a single degree of freedom of the connector. A round ferrule 37 holds the interrogator side multicore fiber 10 precisely (e.g., +−<1 micron) in the center of a high precision, preferably but not necessarily mass-produced split sleeve 36. The split sleeve is flexibly supported, e.g., by springs 38, so that it can adjust position. The ferrule 37 for the multicore fiber 10 is solidly connected to a structure 40 with a relatively large flat surface to fix the rotational angle of the ferrule.

On the left side, there is a corresponding, rotatable ferrule 39 within the split-sleeve 36 that does not affect the split-sleeve connector alignment of the center cores. The rotatable ferrule 39 contains the sensor side multicore fiber 12. Flexibly mounting the split-sleeve 36 allows the split-sleeve 36 to reposition in space to accommodate the two ferrules 39 and 37. The ferrule 39 is rotated using a multi-link universal joint 42 connected to a motor 44 that transmits torque and some axial force. Although there is a space shown between the ferrules 39 and 37, in practice they are moved into contact, e.g., by springs that provide a compressional force on the sensor side. Once optimal core alignment is achieved, the two fibers may be connected.

Figure 11A:
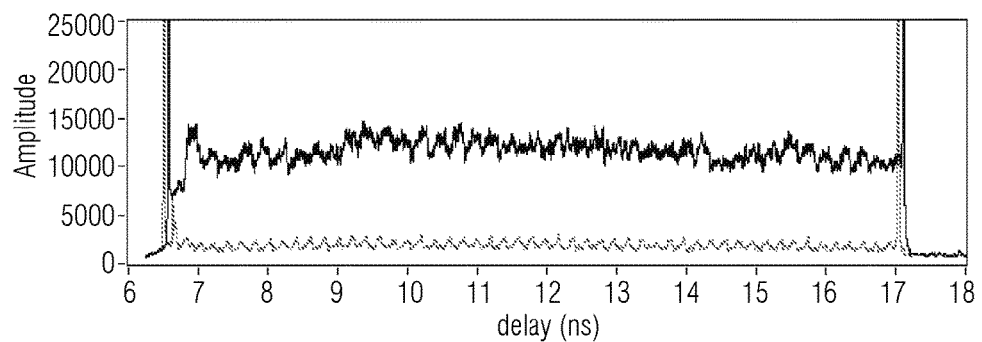
FIGS. 11A-11E are example graphs of reflection v. distance showing iterative increasing alignment of two multicore fibers using the example OFDR-based multicore fiber alignment system.
Figure 11B:
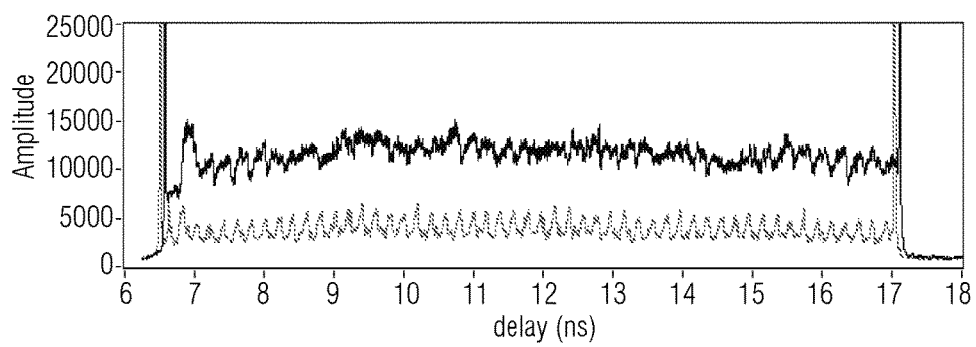
Figure 11C:
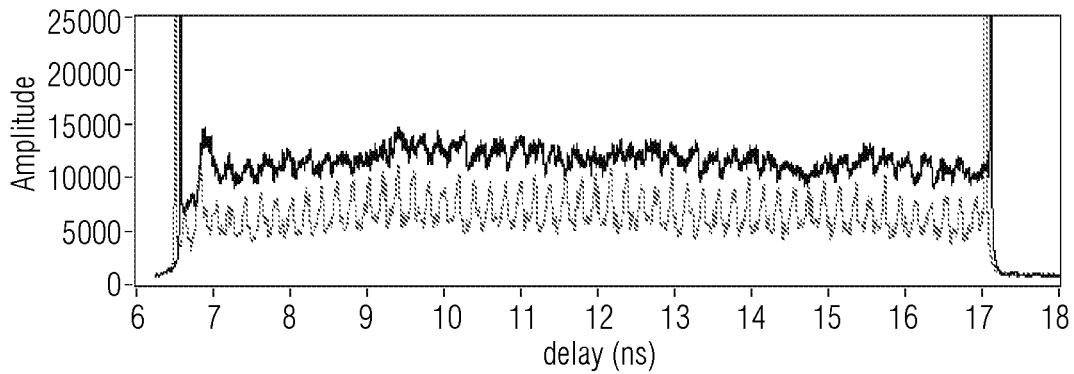
Figure 11D:
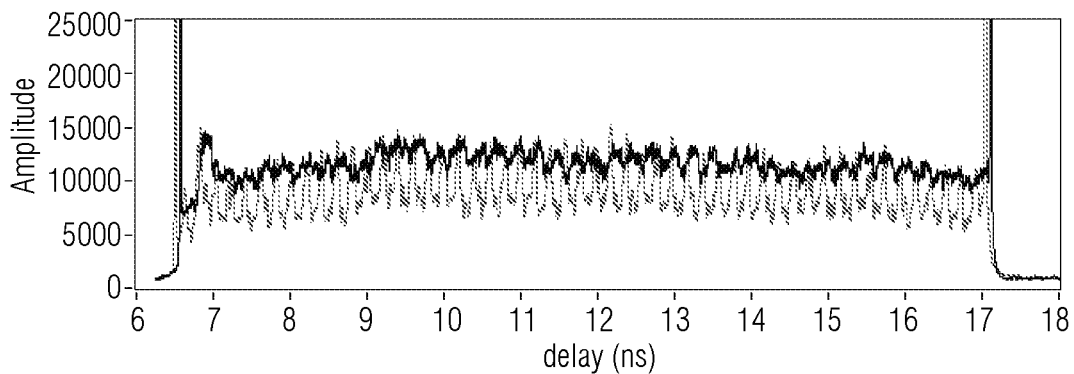
Figure 11E:
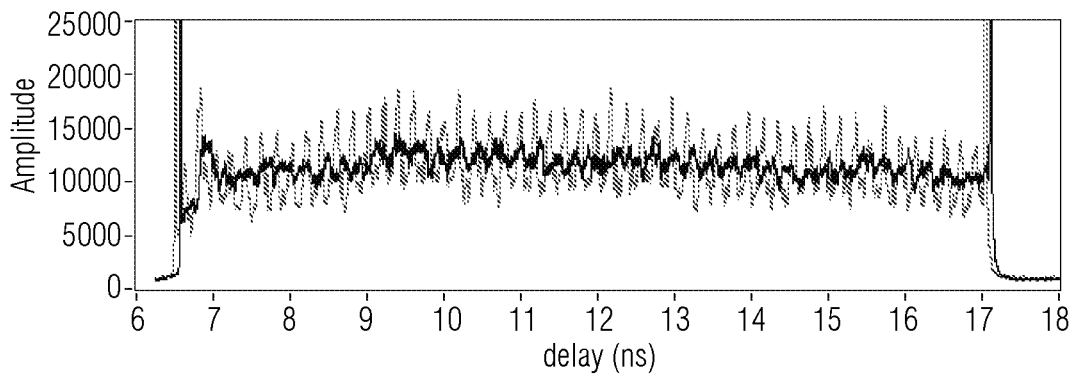

FIGS. 11A-11E are example graphs of reflection v. distance showing iterative increasing alignment of two multicore fibers using the example OFDR-based multicore fiber alignment system. If the cores are not well aligned, and reflection is measured as a function of distance along the center core and one outer core, the plot shown in FIG. 11A is produced with the substantial amplitude difference shown. The dark waveform corresponds to the reflected amplitude detected for the center core and the lighter waveform corresponds to the reflected amplitude detected for one outer core. As the two multicore fibers are rotated towards closer alignment, the amplitude on the outer core (lighter waveform) gets progressively larger as shown in FIGS. 11B-11D. FIG. 11E signals that a desired alignment is achieved, e.g., when the two waveforms have about the same average amplitude.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for aligning a sensing core in a sensing multicore optical fiber with an interrogating core in an interrogating multicore optical fiber, where the sensing core in the sensing multicore optical fiber is paired with the interrogating core in the interrogating multicore optical fiber to form a core pair, the method comprising:
   using optical interferometry to interrogate the core pair through the interrogating core and to determine a first reflection value from the sensing core, wherein the first reflection value represents a degree of alignment for the core pair in a first orientation;
   using optical interferometry to interrogate the core pair through the interrogating core and to determine a second reflection value from the sensing core, wherein the second reflection value represents a degree of alignment for the core pair in a second orientation; and
   identifying an alignment orientation for the core pair based on the first reflection value and the second reflection value.

2. The method in claim 1, further comprising:
   adjusting a relative position between an end of the sensing core and an end of the interrogating core to the alignment orientation, and
   connecting the sensing multicore optical fiber to the interrogating multicore optical fiber with the core pair in the alignment orientation.

3. The method in claim 2, wherein identifying an alignment orientation for the core pair based on the first reflection value and the second reflection value comprises:
comparing the first reflection value that represents the degree of alignment for the core pair in the first orientation with the second reflection value that represents the degree of alignment for the core pair in the second orientation; and
identifying the alignment orientation for connecting the core pair based on the comparing.

4. The method in claim 2, further comprising:
placing at least the ends of the sensing and interrogating multicore optical fibers in a groove of a structure,
bringing the ends of the sensing and interrogating multicore optical fibers into proximity for connection, and
rotating one or both of the sensing and interrogating multicore optical fibers in the groove.

5. The method in claim 2, wherein the sensing multicore optical fiber is included in a first ferrule and the interrogating multicore optical fiber is included in a second ferrule, and wherein the adjusting includes rotation of one or both of the first and second ferrules, the method further comprising:
placing at least ends of the first and second ferrules in a split sleeve connector and rotating one or both of the first and second ferrules while the first and second ferrules are in the split sleeve connector.

6. The method in claim 1, wherein the optical interferometry includes optical frequency domain reflectometry (OFDR), wherein the sensing multicore optical fiber is associated with an instrument, and wherein OFDR sensing and processing of reflected light from the sensing multicore optical fiber is used to determine at least one of: a position and a shape of at least a portion of the instrument.

7. The method in claim 1, wherein the identifying step includes identifying the alignment orientation for connecting the core pair based on:
a largest minimum measured reflection amplitude for the core pair or
one or more of insertion loss and return loss for the core pair.

8. The method in claim 1, wherein the first and second reflection values are from at least one of Bragg grating reflections and Rayleigh scatter in the sensing core of the core pair.

9. An apparatus for aligning a sensing core in a sensing multicore optical fiber and an interrogating core in an interrogating multicore optical fiber, where the sensing core in the sensing multicore optical fiber is paired with the interrogating core in the interrogating multicore optical fiber to form a core pair, the apparatus comprising:
an optical interferometer configured to interrogate the core pair and to determine a first reflection value from the sensing multicore optical fiber in the core pair, wherein the first reflection value represents a degree of alignment for the core pair in a first orientation;
the optical interferometer further configured to interrogate the core pair through the interrogating core and to determine a second reflection value from the sensing core in the core pair, wherein the second reflection value represents a degree of alignment for the core pair in a second orientation, and
circuitry configured to identify an alignment orientation for the core pair based on the first reflection value and the second reflection value.

10. The apparatus in claim 9, further comprising:
an actuator configured to adjust a relative position between an end of the sensing core and an end of the interrogating core to the alignment orientation, and
a connector configured to connect the sensing multicore optical fiber to the interrogating multicore optical fiber with the core pair in the alignment orientation.

11. The apparatus in claim 10, wherein the circuitry is configured to identify the alignment orientation for the core pair based on the first reflection value and the second reflection value by:
comparing the first reflection value that represents a degree of alignment for the core pair in the first orientation with the second reflection value that represents a degree of alignment for the core pair in the second orientation; and
identifying the alignment orientation for connecting the core pair based on the comparison.

12. The apparatus in claim 10, further comprising a structure having a groove, and wherein the actuator is configured to rotate one or both of the sensing and interrogating multicore optical fibers while the sensing and interrogating multicore optical fibers are in the groove.

13. The apparatus in claim 10, further comprising
a first ferrule for the sensing multicore optical fiber and a second ferrule for the interrogating multicore optical fiber, wherein the actuator is configured to rotate one or both of the first and second ferrules; and
a split sleeve structure for at least a first end of the first ferrule and a second end of the second ferrule, the split sleeve structure configured to bring the ends of the sensing and interrogating multicore optical fibers into proximity for connection, wherein the actuator is configured to rotate one or both of the first and second ferrules while the first and second ferrules are in the split sleeve structure.

14. The apparatus in claim 9, wherein the optical interferometer includes an optical frequency domain reflectometer, wherein the sensing multicore optical fiber is associated with an instrument, and wherein the optical frequency domain reflectometer is configured to sense and process reflected light from the sensing multicore optical fiber to determine at least one of: a position and a shape of at least a portion of the instrument.

15. The apparatus in claim 9, wherein the circuitry is configured to identify the alignment orientation based on a largest minimum measured reflection amplitude for the core pair.

16. The apparatus in claim 9, wherein the circuitry is configured to identify the alignment orientation based on one or more of insertion loss and return loss for the core pair.

17. The apparatus in claim 9, wherein the first and second reflection values are from at least one of Bragg grating reflections and Rayleigh scatter in the sensing core of the core pair.

18. A surgical system comprising:
a first multicore optical fiber having one or more cores,
a mounting interface for a surgical instrument, the surgical instrument comprising a second multicore optical fiber, wherein each core of the one or more cores in the first multicore optical fiber is paired with a respective core in the second multicore optical fiber to form one or more core pairs,
an optical interferometer coupled to the first multicore optical fiber and configured to, for each core pair of the one or more core pairs:

interrogate the core pair in a first orientation to determine a first reflection value from the second multicore optical fiber in the core pair, and interrogate the core pair in a second orientation to determine a second reflection value from the second multicore optical fiber in the core pair, wherein the first reflection value represents a first degree of alignment for the core pair, and wherein the second reflection value represents a second degree of alignment for the core pair, and a processor configured to, for each core pair of the one or more core pairs, identify an alignment orientation for the core pair based on the first reflection value of the core pair and the second reflection value of the core pair.

19. The surgical system in claim 18, further comprising:
an actuator configured to adjust a relative position between an end of the first multicore optical fiber and an end of the second multicore optical fiber to an orientation based on the alignment orientation of the one or more core pairs, and a connector configured to connect the second multicore optical fiber to the first multicore optical fiber with the core pair in the orientation.

20. The surgical system in claim 19, wherein the processor is configured to, for each core pair of the one or more core pairs:
compare the first reflection value that represents a degree of alignment for the core pair in the first orientation with the corresponding second reflection value that represents a degree of alignment for the core pair in the second orientation; and identify the orientation for connecting the second multicore optical fiber to the first multicore optical fiber based on the comparison.

21. The surgical system in claim 19, wherein the actuator is configured to rotate one or both of the first multicore optical fiber and the second multicore optical fiber while the first multicore optical fiber and the second multicore optical fiber are in a groove.

22. The surgical system in claim 19, further comprising:
a first ferrule for the first multicore optical fiber and a second ferrule for the second multicore optical fiber, wherein the actuator is configured to rotate one or both of the first and second ferrules; and a split sleeve structure for at least an end of the first ferrule and an end of the second ferrule, the split sleeve structure configured to bring the ends of the first and second multicore optical fibers into proximity for connection, wherein the actuator is configured to rotate one or both of the first and second ferrules while the first and second ferrules are in the split sleeve structure.

23. The surgical system in claim 18, wherein the processor is configured to, for each core pair of the one or more core pairs, identify the alignment orientation based on:
a largest minimum measured reflection amplitude for the core pair, or one or more of insertion loss and return loss for the core pair.

* * * * *